(12) United States Patent
Hwang

(10) Patent No.: US 6,186,352 B1
(45) Date of Patent: Feb. 13, 2001

(54) PORTABLE FOOD CONTAINER FOR FEEDING ANIMALS

(76) Inventor: Yaw-Shiun Hwang, NO.56, Min Sheng Street, Feng-Yuan City 42041 (TW)

( * ) Notice: Under 35 U.S.C. 154(b), the term of this patent shall be extended for 0 days.

(21) Appl. No.: 09/537,810

(22) Filed: Mar. 23, 2000

(51) Int. Cl.⁷ .................................................. B65D 21/02
(52) U.S. Cl. ....................... 220/23.86; 220/759; 220/756; 220/4.27
(58) Field of Search .............................. 220/23.83, 23.86, 220/23.87, 759, 752, 754, 756, 757, 760, 761, 763, 770, 4.27, 4.04, 4.05, 4.08, 326

(56) References Cited

U.S. PATENT DOCUMENTS

| | | |
|---|---|---|
| 1,967,794 * | 7/1934 | Wagner . |
| 2,595,113 * | 4/1952 | Taberer . |
| 2,896,812 * | 7/1959 | Paprocki . |
| 4,428,145 * | 1/1984 | Wheeler ..................................... 43/55 |
| 5,056,424 * | 10/1991 | Lai . |
| 5,299,705 * | 4/1994 | Dettmar ............................. 220/23.83 |
| 5,348,185 * | 9/1994 | Buckner, III et al. ................ 220/326 |
| 5,363,977 * | 11/1994 | Hoff ..................................... 220/4.27 |
| 5,400,907 * | 3/1995 | Chen ................................... 206/459.1 |
| 5,413,236 * | 5/1995 | Kenevan .............................. 220/4.28 |
| 5,417,329 * | 5/1995 | Whitman .............................. 206/499 |
| 5,813,557 * | 9/1998 | Oratz .................................... 220/23.9 |
| 5,992,665 * | 11/1999 | Deeter ................................. 220/23.4 |

* cited by examiner

Primary Examiner—Stephen Castellano

(57) ABSTRACT

A portable food container for feeding animals is provided and includes a container having a threaded opening engaged with a threaded lid, a pair of bowls engageable with two ends of the container respectively and each including a protrudent retaining hole respectively engageable with a pair of retaining pins of an elastic arcuate handle. This disclosure is characterized in ready assembling or disassembling and in corresponding with the environmental sanitation.

3 Claims, 7 Drawing Sheets

PORTABLE FOOD CONTAINER FOR FEEDING ANIMALS

BACKGROUND OF THE INVENTION

The present invention relates to food containers and more particularly to a portable food container for feeding favorite animals which container is easy to assemble or disassemble and is portable on travelling or on a picnic.

To raise a favorite animal such as a dog or a cat is popular in modern families. Most of the people bring their favorite with them on outdoor activities. So they need a food container to contain animal's food in order to feed their animal on travelling or on a picnic. However most of them bring with them the canned animal food and pour the food on the ground when feeds the animal. Therefore, the ground is contaminated and the environmental sanitation is damaged.

A typical animal's food container 10 is shown in FIG. 1 which comprises a lid 11 and a container 12. The container has a threaded outer periphery 121 abutting the upper rim and the lid 11 has a threaded inner periphery abutting the lower rim made engageable with the threaded outer periphery 121 and a handle knob 111 on the top for facilitating the fastening of the lid 11 onto the container 12. The container farther has a strap around the body for facilitating the people to carry the container 10 with them. However, this type of food container contains small amount of animal which can only feed a single small animal and have nowhere to contain water. Besides, if the animal can not finish the food at one time, the residue may be rotten that could not feed the animal next time.

SUMMARY OF THE PRESENT INVENTION

The present invention has a main object to provide a portable food container for feeding animals which container an contain large amount of animal food and the food is separately poured out of the container.

Another object of the present invention is to provide a portable food container for feeding animals which container includes a pair of bowls for receiving suitable amount of food from the container to feed more than one animals or containing the water to drink the animal.

Further object of the present invention is to provide a portable food container for feeding animals which container is easy to assemble or disassemble.

The present invention will become more fully understood by reference to the following detailed description thereof when read in conjunction with the attached drawings.

DETAILED DESCRIPTION OF THE PREFERRED EMBODIMENT

Figure 1:
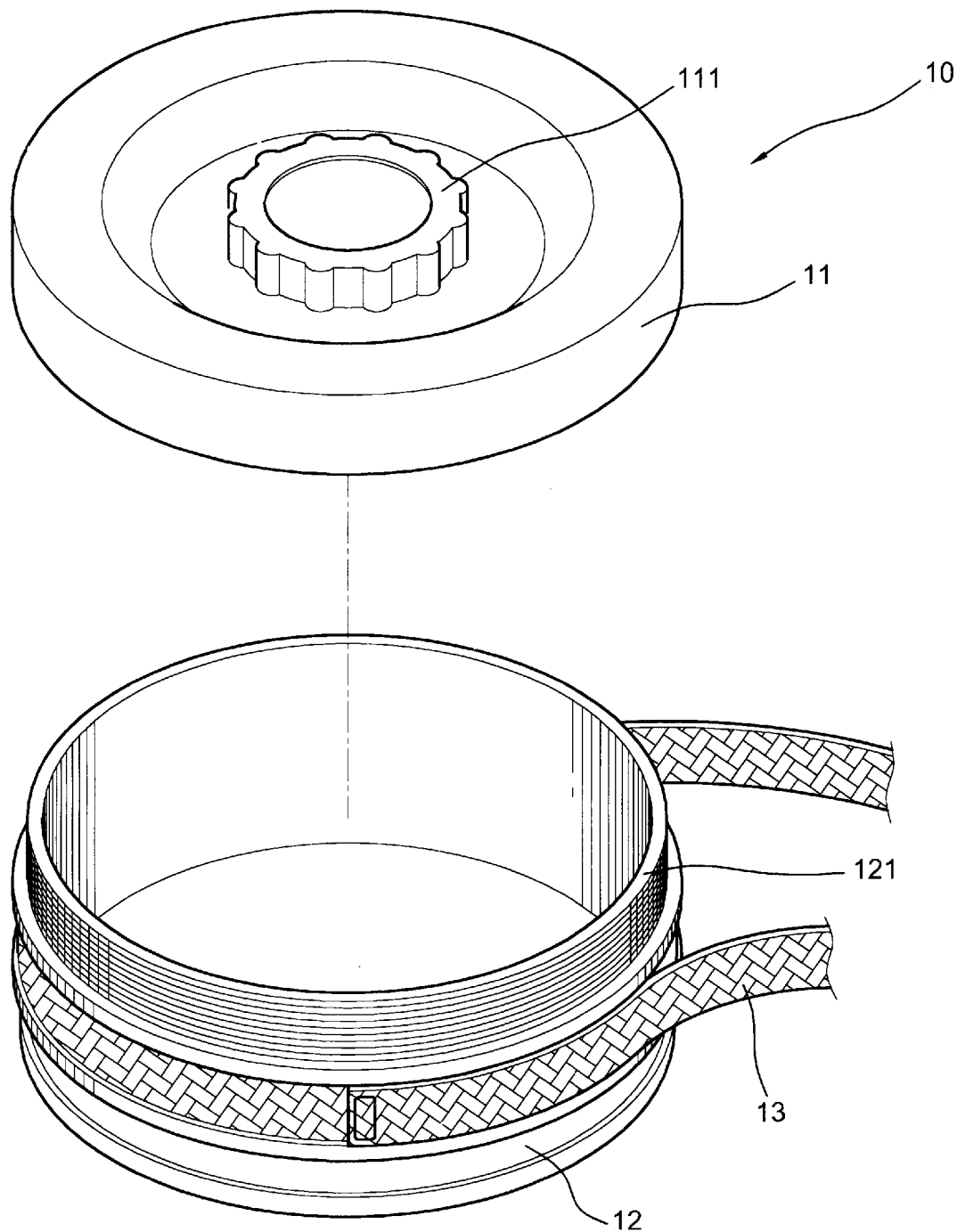
FIG. 1 is an exploded perspective view of a portable animal food container according to a prior art.
Figure 2:
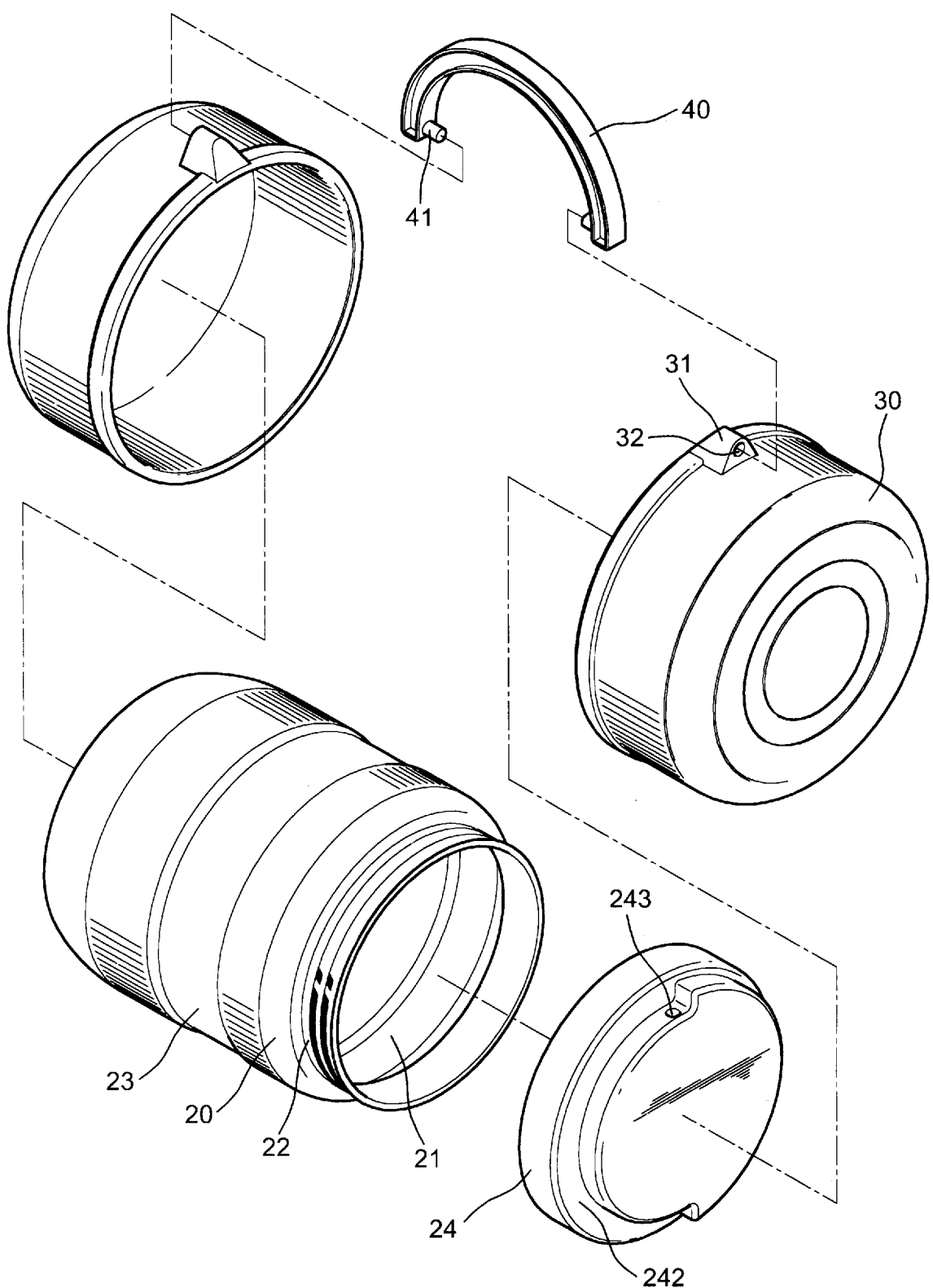
FIG. 2 is an exploded perspective view of a potable animal food container according to the preferred embodiment of the present invention.
Figure 3:
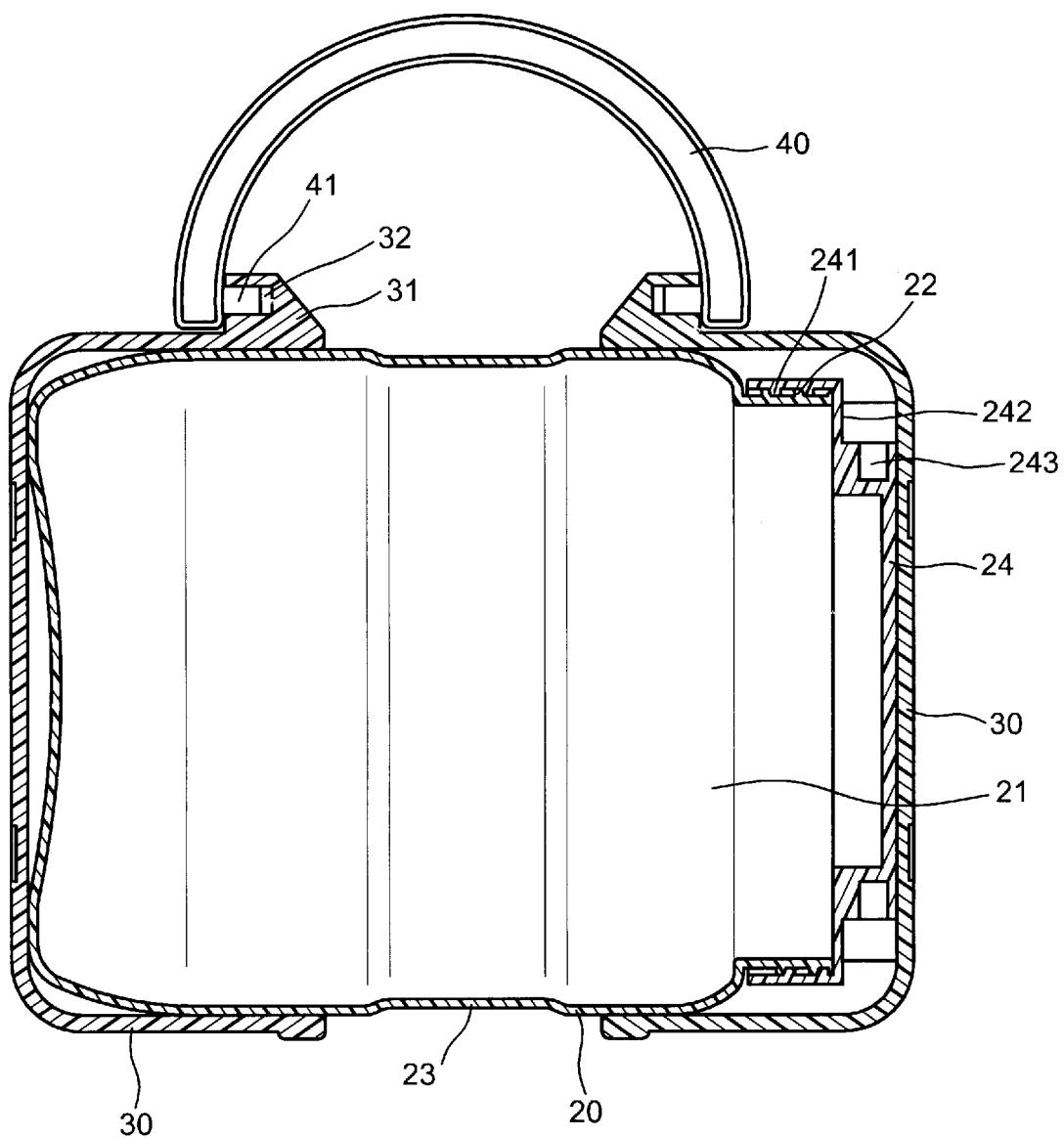
FIG. 3 is a sectional view to show an assemblage of FIG. 2.

With reference to FIGS. 2 and 3 of the drawings, the portable food container of the present invention comprises generally a container 20, a pair of bowls 30 attachable to the container 20 and handle 40 attachable to the bowls 30 or the container 20.

Figure 7:
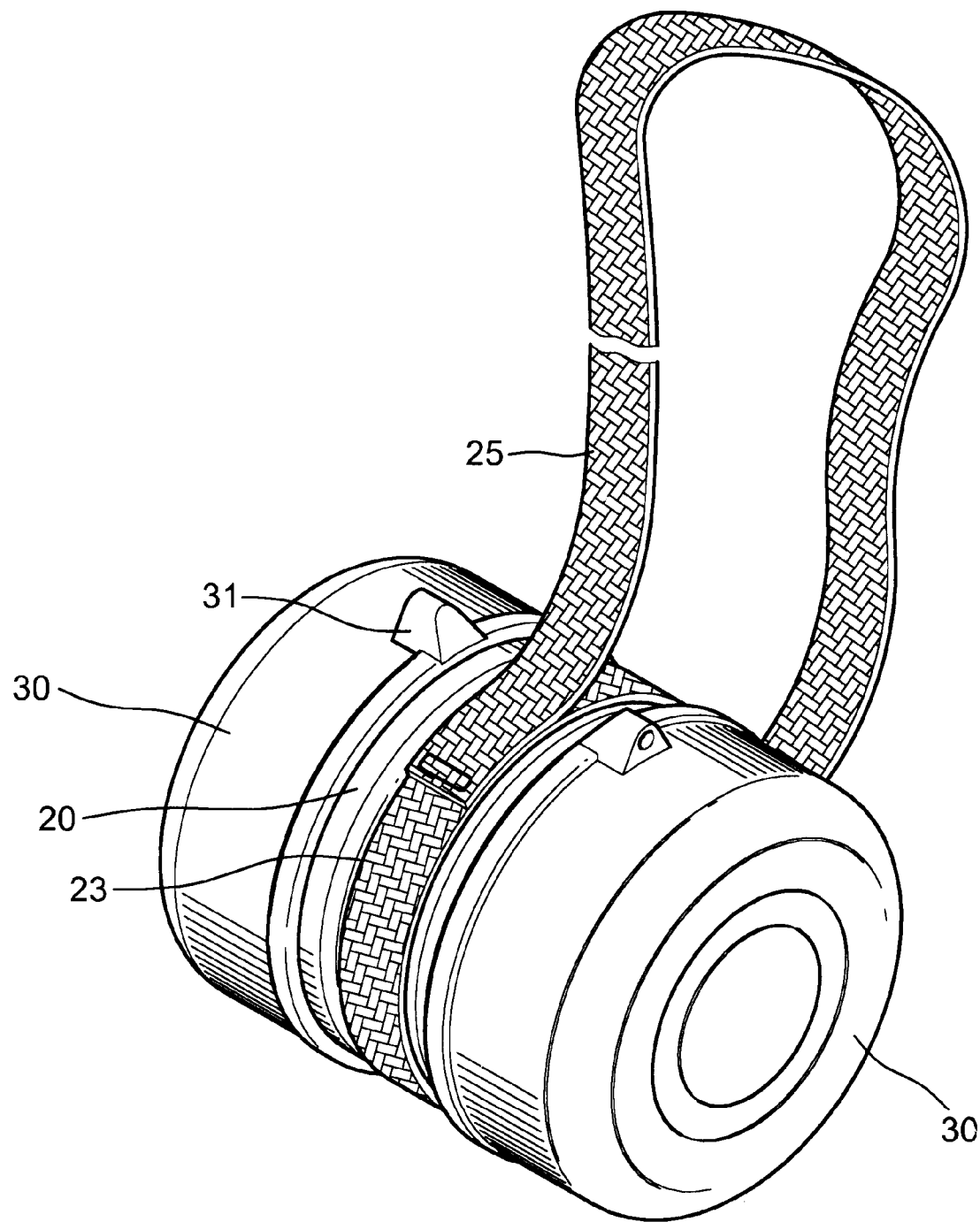
FIG. 7 is a perspective to show a strap attached to the container.

The container 20 has a hollow interior body, a narrowed opening 21, a threaded outer periphery 22 abutting the opening 21 and an annular depression 23 centrally from around an outer periphery of the body for attaching a strap 25 therein (as shown in FIG. 7).

A lid 24 has a threaded inner periphery 241 engageable with the threaded outer periphery 22 of the container 20, a semi-circular depression 242 on the top and a pair of first retaining holes 243 symmetrically formed in the opposing sides of the depression 242.

The bowls 30 are separately attachable to two ends of the container 20 and each has a projection 31 and a second retaining hole 32 in the projection 31.

The handle 40 has an elastic arcuate body and a pair of retaining pins 41 projected inward from the opposing inner peripheries abutting two ends and facing to each other. The retaining pins 41 are engageable with the first retaining holes 243 of the lid 24 or the second retaining holes 32 of the bowls 30.

Figure 4:
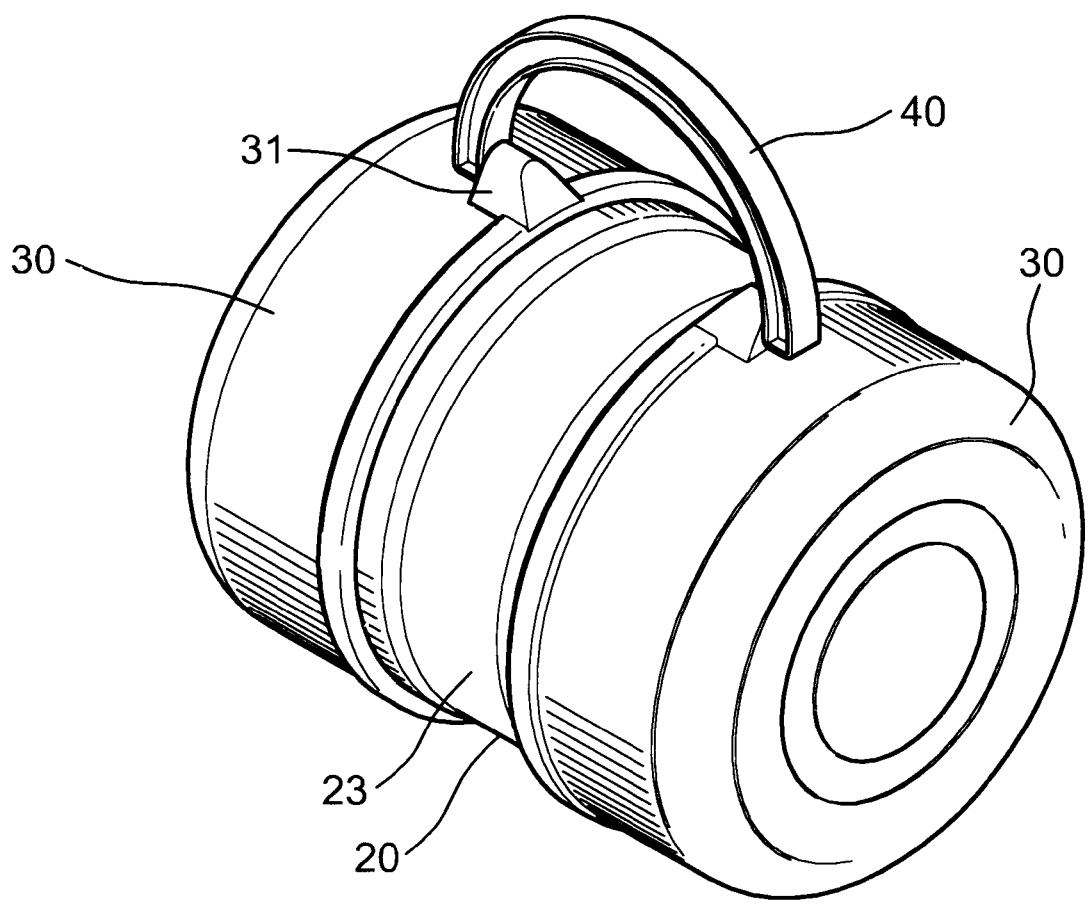
FIG. 4 is a perspective view of FIG. 3.

When assembling, first fasten the lid 24 onto the opening 21 of the container 20, than attach the pair of bowls 30 onto two ends of the container 20 respectively and align the projections 31 with each other and then respectively engage the retaining pins 41 into the second retaining holes 32 of the bowls 30 (as shown in FIGS. 3 and 4). Because of that the handle 40 is elastic, the retaining pins 41 are readily engaged with the second retaining holes and the bowls 30 are protected by the handle 40 from unintentionally disassembled with the container 20.

Figure 5:
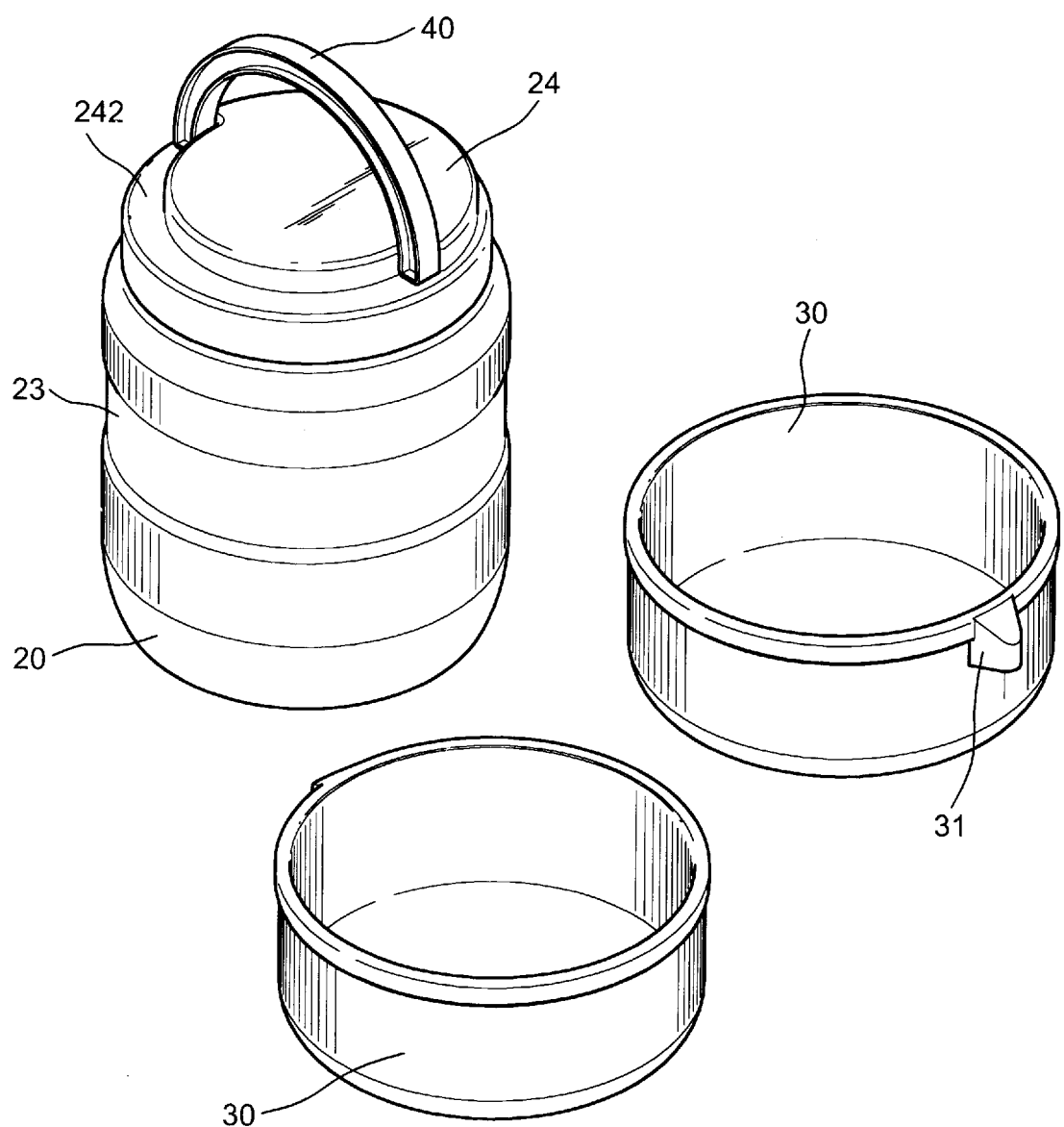
FIG. 5 is a perspective view to show that the pair of bowls are disassembled from the container.
Figure 6:
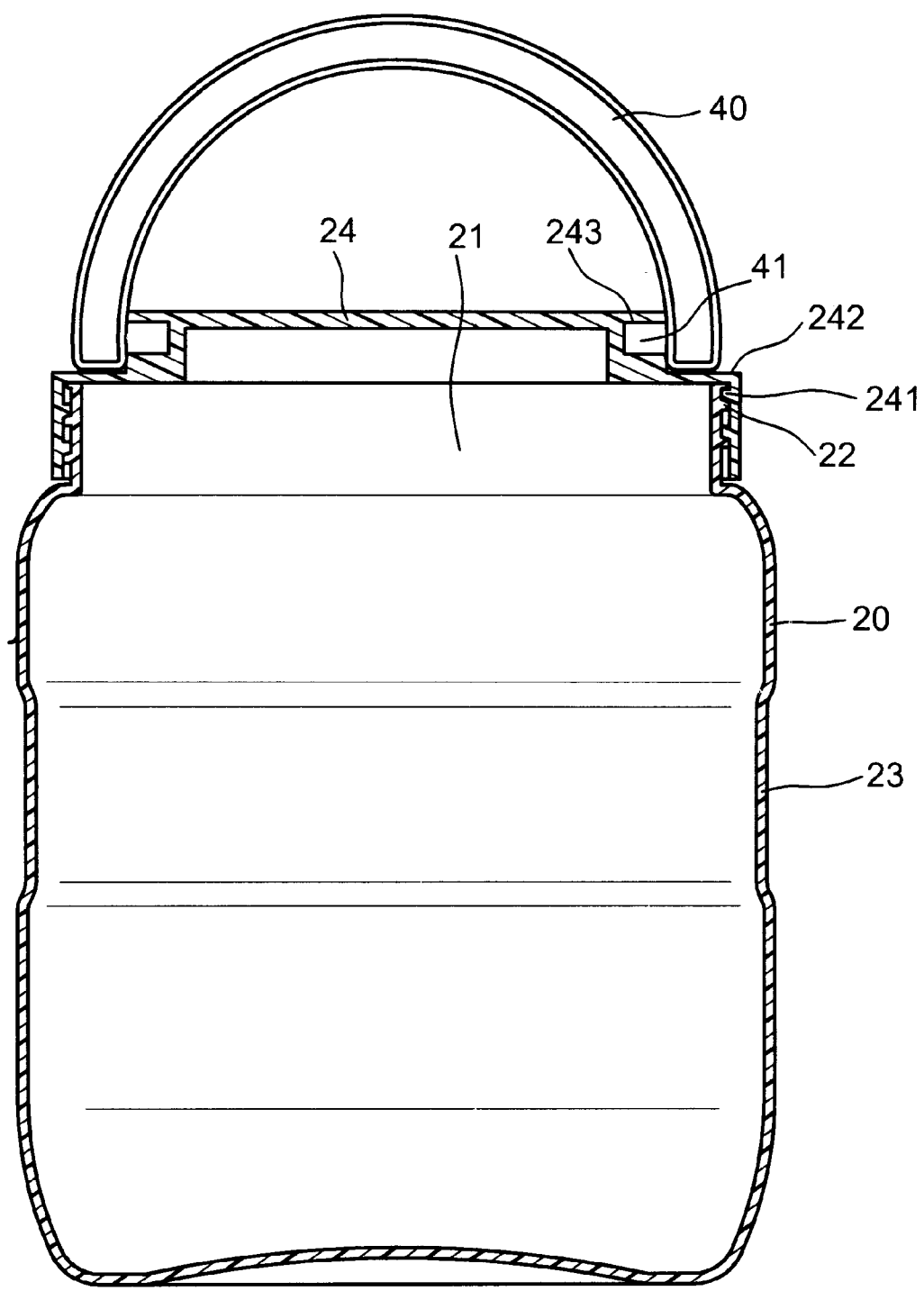
FIG. 6 is a sectional view to show the handle engaged with the container.

Referring to FIG. 5, when in use, first disengage the handle 40 with the bowls 30 which are automatically disengaged with the container 30, then engage the handle 40 with lid 24 (as shown in FIG. 6) and unfasten the lid 24 from the container 20, and then pour suitable amount of animal food into the bowls 30, one of which may be used to contain water if there is only a single animal. After the food is ate up, clean the bowls 30 and engage them with the container and the handle 40 with the bowls 30 again, then the portable food container is assembled (as shown in FIG. 4). If the food container has a strap 25 therearound (as shown FIG. 7), the handle 40 may not be engaged with the bowls 30.

The specification relating to the above embodiment should be construed as exemplary rather than as limitative of the present invention, with many variations and modifications being readily attainable by a person of average skill in the art without departing from the spirit or scope thereof as defined by the appended claims and their legal equivalents.

I claim:

1. A portable food container for feeding animals comprising:
   a container having a hollow interior body, a narrowed opening, a threaded outer periphery abutting the opening and an annular depression centrally formed around an outer periphery of the container;
   a lid having a threaded inner periphery engageable with the threaded outer periphery of the container, a semi-circular depression on a top and a pair of first retaining holes symmetrically formed in opposing sides of the depression;

a pair of bowls engageable with two ends of the container respectively and each having a projection on an outer periphery abutting a rim thereof and a second retaining hole in the projection;

a handle having an elastic arcuate body and a pair retaining pins projected inward from an inner periphery abutting two ends and engageable with the second retaining holes of the bowls.

2. The portable food container according to claim 1 wherein said retaining pin enables to engage with the first retaining holes of said lid.

3. The portable food container according to claim 1 farther includes a strap attached to the annular depression of the container.

* * * * *